Oct. 14, 1958

A. G. ZEMAN 2,856,231

RIGID RETRACTABLE AUTOMOBILE TOP WITH
AUTOMATIC LATCHING MEANS

Filed April 5, 1954

ALBERT G. ZEMAN
INVENTOR.

BY

Agent

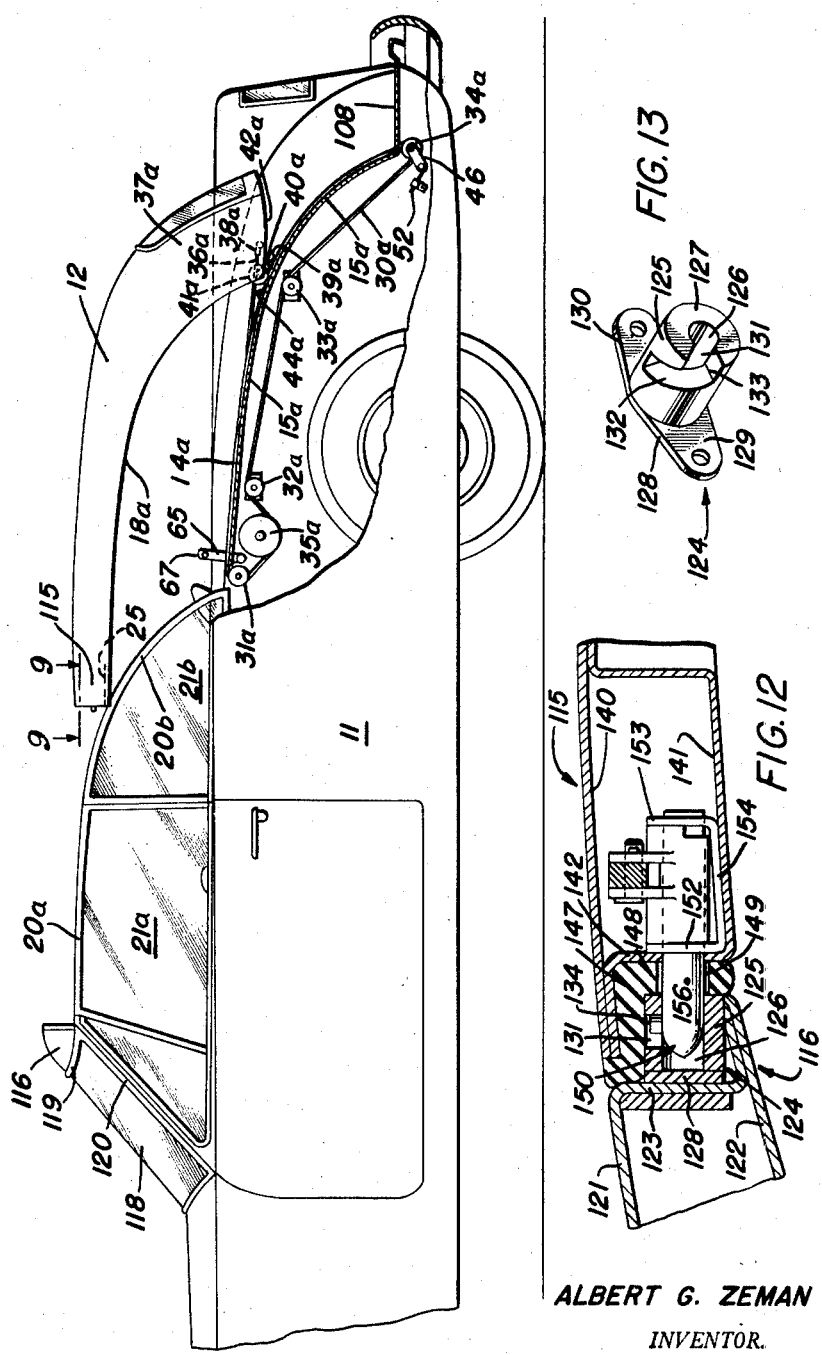

Oct. 14, 1958 A. G. ZEMAN 2,856,231
RIGID RETRACTABLE AUTOMOBILE TOP WITH
AUTOMATIC LATCHING MEANS
Filed April 5, 1954 7 Sheets-Sheet 5
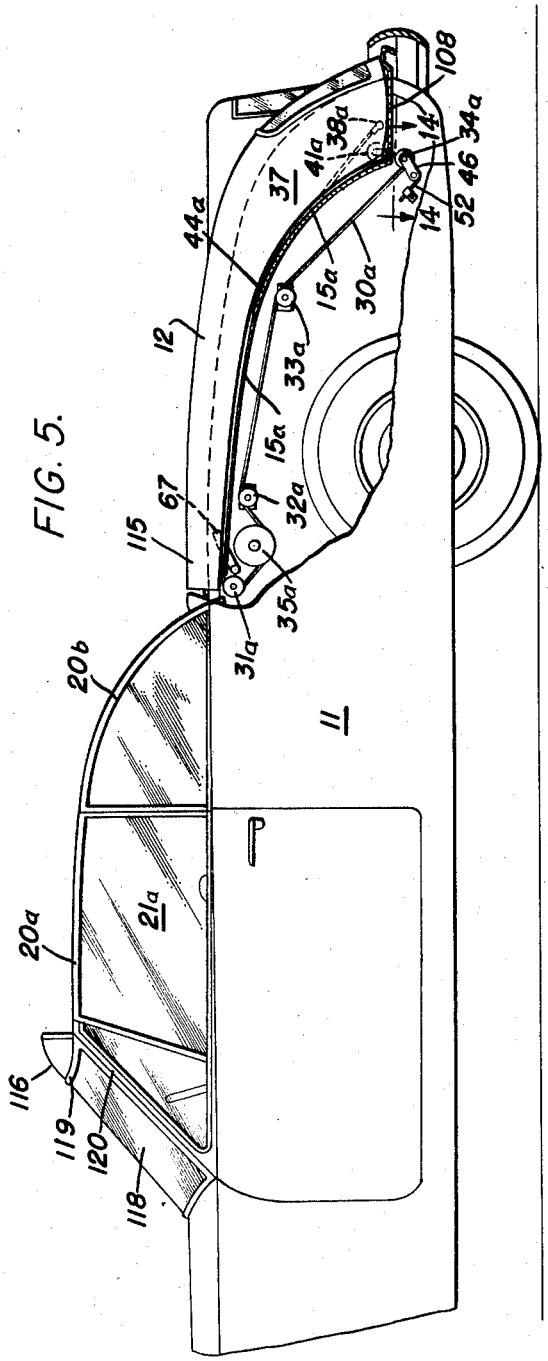
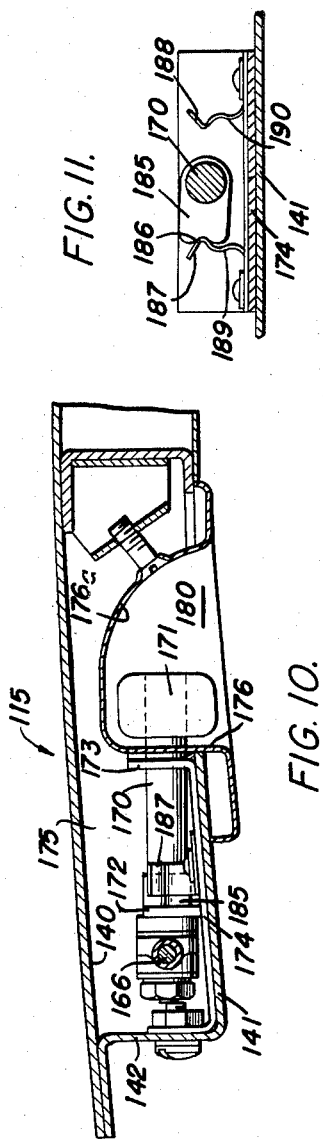
ALBERT G. ZEMAN
*INVENTOR.*
BY
Agent

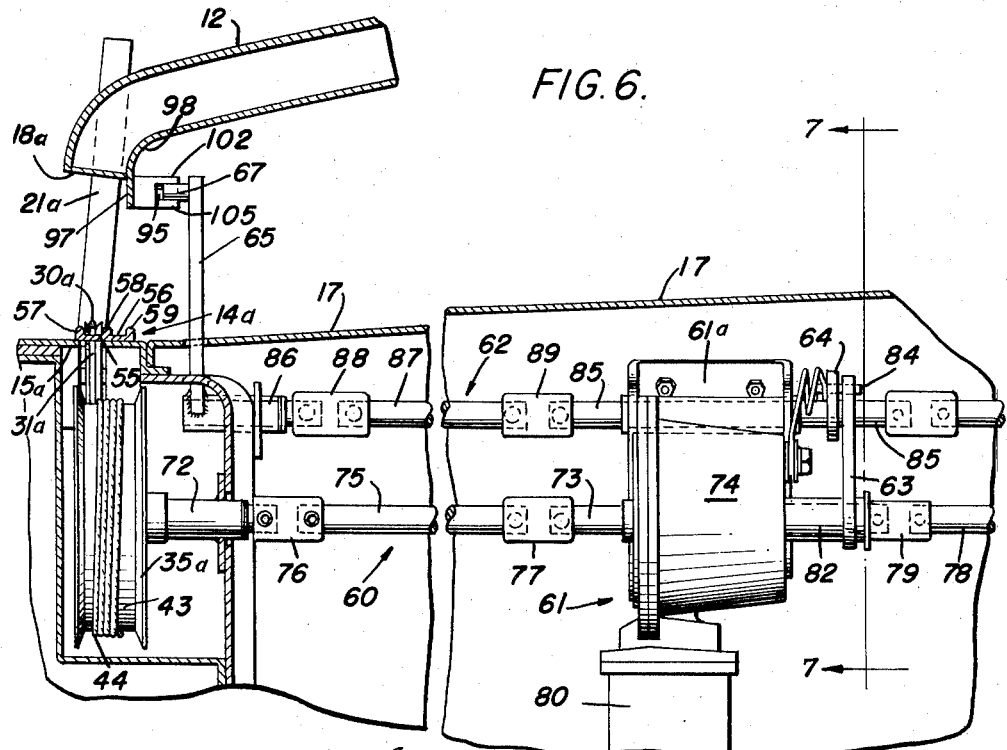
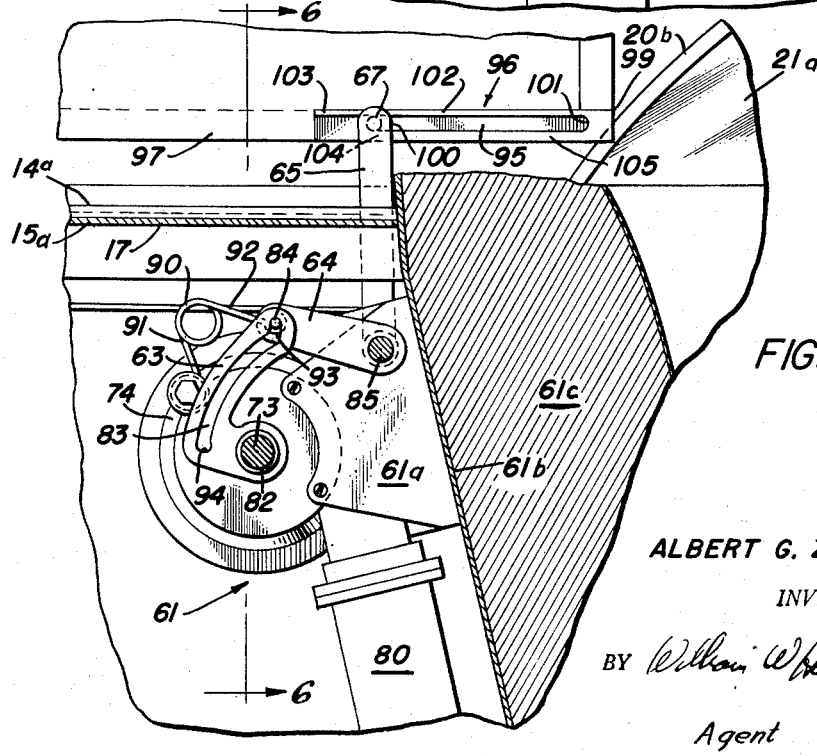

Oct. 14, 1958

A. G. ZEMAN 2,856,231

RIGID RETRACTABLE AUTOMOBILE TOP WITH
AUTOMATIC LATCHING MEANS

Filed April 5, 1954

ALBERT G. ZEMAN INVENTOR.

BY *William W. Haeflige*

Agent

United States Patent Office 2,856,231
Patented Oct. 14, 1958

2,856,231

RIGID RETRACTABLE AUTOMOBILE TOP WITH AUTOMATIC LATCHING MEANS

Albert G. Zeman, Los Angeles, Calif., assignor to McCulloch Motors Corporation, Los Angeles, Calif., a corporation of Wisconsin Application April 5, 1954, Serial No. 420,857

9 Claims. (Cl. 296—117)

This invention relates to devices for raising and lowering automobile roofs or tops, and more specifically to a novel mechanism and combination of elements operative for guidedly moving an automobile hard top rearwardly into retracted position over the rear deck of an automobile, and alternatively for guidedly moving the hard top forwardly and upwardly into raised position.

It is an object of the invention to provide a novel mechanism for raising and lowering an automobile hard top and for automatically locking the top in retracted or lowered position in such a way that it may be automatically released prior to being raised.

It is another object of the invention to provide a novel reversible mechanism for moving an automobile hard top forwardly or rearwardly and for automatically locking the top in rearward position and for releasing the top from locked position and partially raising it prior to moving it forwardly.

It is another object of the invention to provide a novel mechanism for automatically raising or lowering an automobile hard top, the mechanism including a reversible drive means and differential mechanism operative to move the automobile hard top forwardly or rearwardly and means for locking the top in either position.

It is another object of the invention to provide a novel means for automatically guiding the fore and aft portions of an automobile hard top as the top is moved from raised position to lowered position on the rear deck of the automobile and alternatively for guiding the top from lowered position into raised position.

It is a further object of the invention to provide novel means for locking the retractable automotive hard top in forward or raised position.

These and other objects and advantages of the invention will become apparent in the following specification taken in conjunction with the drawings wherein:

Figure 4 is a view similar to Figure 3 with the left rear fender broken away to show the actuating mechanism for raising and lowering the hard top, and also illustrating an intermediate position of the top during raising or lowering thereof;

Figure 5 is a view similar to Figure 4 showing the top in rearward or lowered position over the rear deck;

Figure 6 is an elevational view of a portion of the hard top raising and lowering mechanism taken on line 6—6 of Figure 7;

Figure 7 is a side view of a portion of the hard top raising and lowering mechanism taken on line 7—7 of Figure 6 and illustrating the position thereof during lowering of the top;

Figure 10 is an elevation view of the forward locking mechanism, partly in section, and taken on line 10—10 of Figure 9;

Figure 11 is a sectional view of a portion of the forward locking mechanism taken on line 11—11 of Figure 9;

Figure 12 is an elevational view of another portion of the forward locking mechanism taken on line 12—12 of Figure 1;

Figure 13 is a perspective view of a cam which is a component part of the forward locking mechanism.

Figure 1:
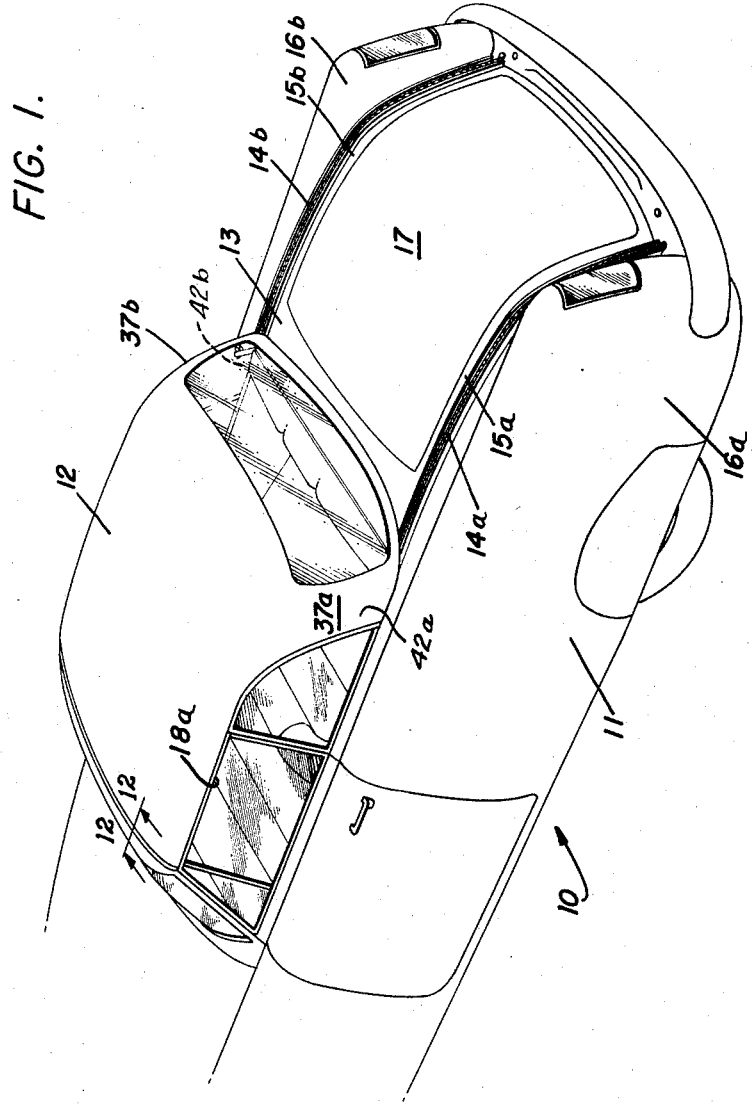
Figure 1 is an oblique external view of an automobile having a movable hard top, looking toward the left rear portion thereof and illustrating the raised or forward position of the hard top and the rear deck of the automobile.

Referring now to Figure 1, there is therein illustrated a hard top convertible type automobile 10 having a body 11 and a hard top or roof 12 shown in elevated position. The top is generally curved convexly from front to rear, with greater curvature at the rear thereof. The automobile includes a rear deck 13 having a contour substantially similar to that of the hard top 12. The rear deck 13 is provided with left and right side narrow metallic guides 14a and 14b, each of which is disposed fore and aft along the rear deck 13, conforming to the curvature thereof, and is joined to one of the two laterally disposed left and right side portions 15a or 15b of the rear deck lying between a rear fender 16a or 16b and the upwardly swingable panel 17, which normally covers the truck space. The portions 15a and 15b of the rear deck conform in curvature to the left and right side lower edges 18a of the hard top, in order that the latter edges may be supported at least in part by portions 15a and 15b of the rear deck.

Figure 3:
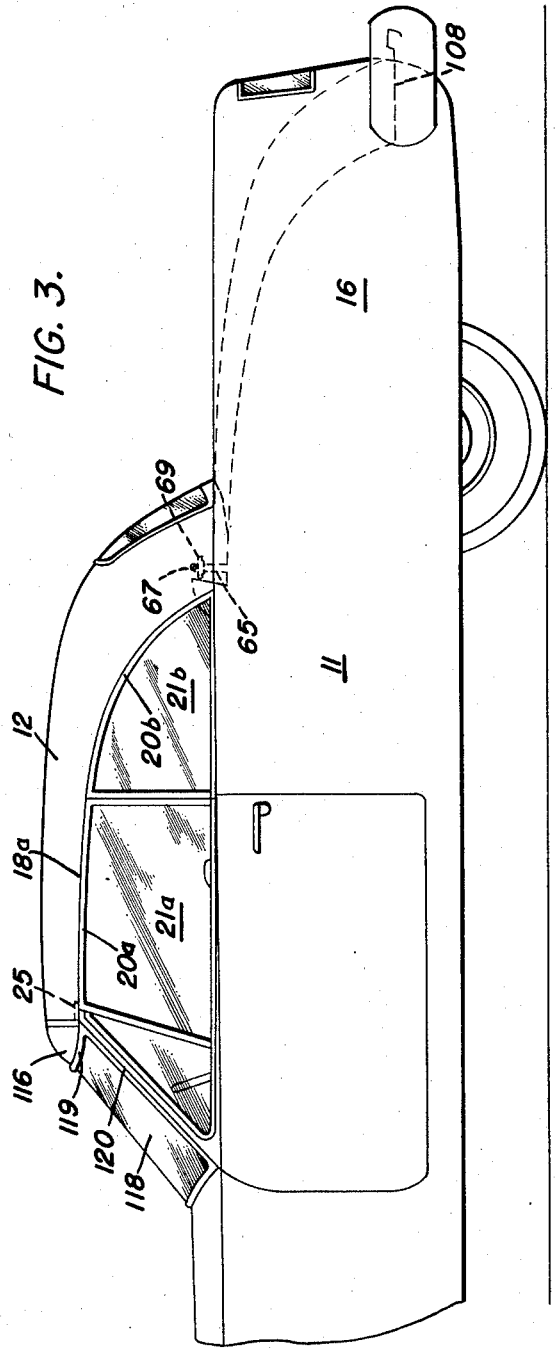
Figure 3 is a side elevation of an automobile incorporating the movable hard top and illustrating the top in raised position, with the rear deck shown in dotted lines.

Referring also to Figure 3, it will be seen that metallic guide strips 20a and 20b are fastened to the upper edges of the two fore and aft left side windows 21a and 21b. Similar guide strips are fastened to the two fore and aft right side windows of the the automobile, not shown. The guide strips on each pair of fore and aft side windows form a guide track for a metallic guide 25 shown in dotted lines at either side of the forward portion of the hard top. It will be understood that the side windows must necessarily be in raised position in order that the metal strips 20a and 20b may properly engage the guides 25 when the top is moved rearwardly or forwardly.

Figure 2:
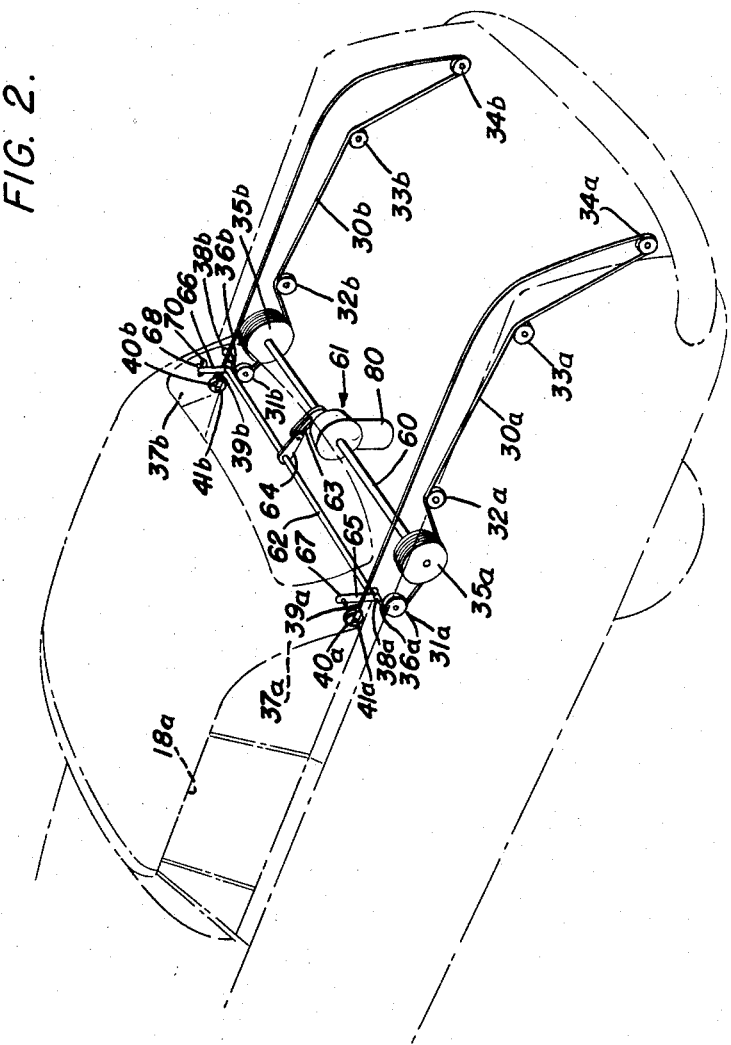
Figure 2 is another view similar to Figure 1 with the external outline of the automobile shown in dotted lines and illustrating the mechanism for moving the hard top.

Referring now to Figures 2, 4 and 5, the top 12 is shown in Figure 4 as being partially retracted and in Figure 5 as being completely retracted. The left rear fender 16a has been broken away in order that the mechanism for raising and lowering the top might be illustrated. The latter mechanism includes a pair of left and right side cables 30a and 30b, cable guide means comprising pulleys 31a and 31b, 32a and 32b, and 33a and 33b, 34a and 34b, and cable winding means comprising a pair of left and right side drums 35a and 35b around which portions of the cables are wound. The two ends 36a and 36b of the cables which pass over the forward pulleys are attached respectively to the left and right rear side panels 37a and 37b of the hard top by means of a swingable connection 38a and 38b which may comprise eye terminals. The opposite two ends 39a and 39b of the cables are attached respectively to the same rear side panels of the top by means of swingable connections 40a and 40b which may comprise U-shaped brackets. The latter swing about pins passing through left and right supporting wheels 41a and 41b which ride in left and right side guides 14a and 14b when the hard top is raised or lowered. The wheels are located adjacent the inside surfaces of the panels 37a and 37b and are rotatably pinned adjacent the forward and bottom edges of the panels in such position that the rims of the wheels project below the bottom edges 42a and 42b of the side panels 37a and 37b.

To pull the top rearwardly, the drums 35a and 35b are rotated clockwise, as illustrated in the three views Figures 2, 4 and 5. Several turns of each cable are taken about each drum so as to supply the requisite driving traction or friction grip between the drum surface 43, as shown in Figure 6, and the cable turns 44. Extending rearwardly from the underside of drum 35a, the cable 30a passes upwardly over the tops of idler pulleys 32a and 33a, and under spring loaded tensioning pulley 34a. Forward pulley 31a is spaced forwardly of the drum and immediately forwardly of and beneath the forward end of channel 14a. Intermediate pulleys 32a and 33a are disposed directly beneath the channel member 14a and intermediate the ends thereof, pulley 32a lying directly rearwardly of drum 35a and pulley 33a lying further rearwardly and beneath the downwardly curved rearward portion 44a of channel 14a.

Figure 14:
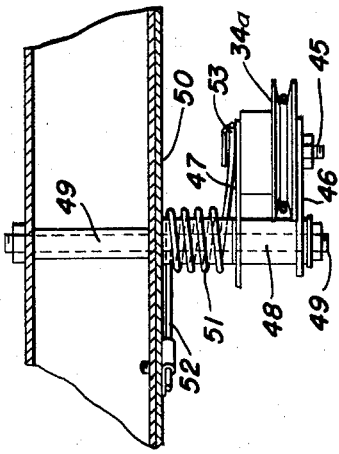
Figure 14 is a plan view, partly in section, of a guide member and tensioning means for the cable actuating means for the hard top, and taken on line 14—14 of Figure 5.

Each of the vertically aligned pulleys 31a, 32a, and 33a, rotates around a pin which is fastened to a body panel, not shown, disposed beneath the rear deck portion 15a and beneath the channel member 14a. The rear pulley 34a is supported by a pin 45 which is in turn supported between bracket arms 46 and 47, as seen in Figure 14. The bracket arms are in turn attached to a sleeve 48 rotatably mounted on the end of a pin 49 projecting outwardly from panel member 50. A torsion spring 51 is also positioned about sleeve 48. Arm 52 of spring 51 is affixed to the end of pin 45. It will be seen that the spring and spring arms urge the pulley 34a downwardly in Figures 4 and 5 in a clockwise direction, thereby exerting a force on the cable 30a operative to take up any slack on that portion of the cable extending rearwardly from drum 35a and upwardly onto the rear portion of guide 14a to the connection 40a joining the end of the cable to the left rear panel 37a.

Referring to Figure 6, it will be seen that guide strip 14a comprises two side by side channels 55 and 56 disposed between rail members 57, 58 and 59. Outside channel 55 operates to guide portions of the cable 30a lying between forward pulley 31a and connection 38a and between rear pulley 34a and connection 40a, as the top 12 is elevated forwardly or retracted rearwardly. The inside channel 56 operates to guide the top supporting wheel 41a therein as the top is raised or lowered, it being evident that the extent by which the wheel 41a projects beneath the lower edge 42a of side panel 37a is sufficient to provide clearance between that edge and the channel rails 57, 58, and 59 at all positions of the top with respect to the rear deck 13. It is of course understood that similar cable and top guide mechanism is associated with the channel strip 14b on the opposite side of the rear deck.

Referring now to Figures 2, 6, and 7, it will be seen that means is provided for rotating the drums 35a and 35b either clockwise or counterclockwise. This means may comprise an elongated transversely extending shaft system 60 having opposite ends joined to the two drums and driven in rotation intermediate the ends thereof by powered driving means 61, which is positioned beneath the forward portion of the rear deck 17. Powered means 61 is supported by bracket 61a, which is in turn joined to panel 61b beneath rear seat cushion 61c. Powered means 61 also transmits driving torque to a parallel transversely extending shaft system 62, journaled in bracket 61a, through a slotted cam 63 rotated by the powered means 61 and a follower arm 64 which engages cam 63 and rotates shaft system 62 in response to movement of the cam. Rigidly joined to opposite ends of shaft system 62 are two upwardly extending locking arms 65 and 66. The upper ends of the arms are provided respectively with horizontal engaging lugs 67 and 68 adapted to seat against the upper surfaces of plate members 69 and 70 attached respectively to the inside walls of rear side panels 37a and 37b of the roof 12, when the latter is in raised position as shown in Figures 2 and 3. The lugs 67 and 68 serve to hold down the plate members 69 and 70 and thus to hold down the rear portion of the hard top 12 when the latter is in raised or elevated position.

Figure 8:
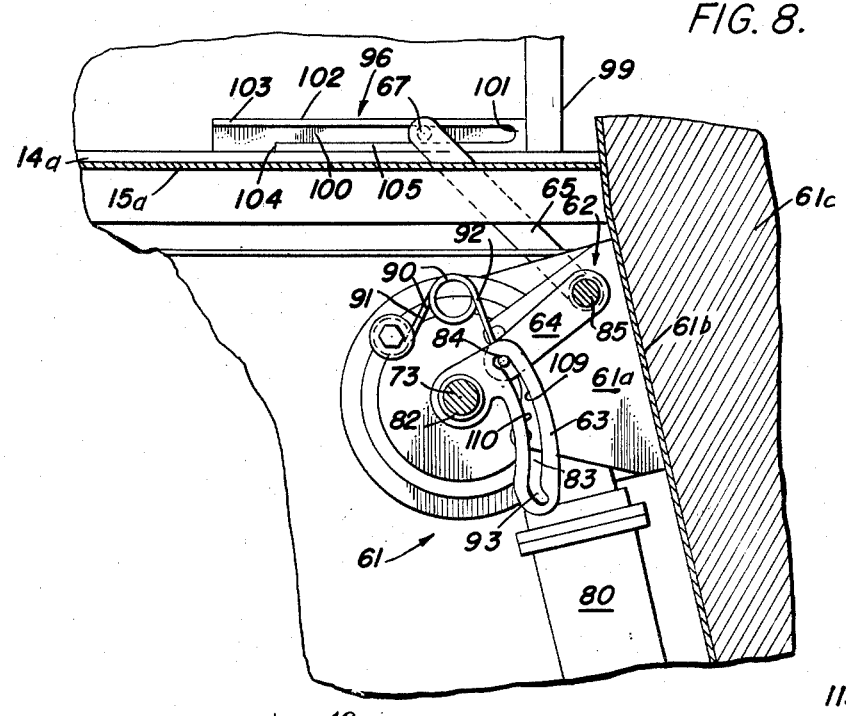
Figure 8 is another view similar to Figure 7 showing the position of the mechanism after the top is fully retracted or lowered.

Referring to Figures 6, 7, and 8, it will be seen that the portion of shaft system 60 disposed between the drum 35a and the powered driving means 61 includes a stub shaft 72 attached to the drum, a stub shaft or output shaft 73 projecting from gear box 74, and an elongated intermediate shaft 75 connected to the two shafts 72 and 73 by means of universal couplings 76 and 77. Shaft 73 extends through the gear box 74 to provide a stub shaft projecting rightwardly therefrom which is connected to rightwardly extending intermediate shaft 78 by means of universal coupling 79.

The gear box 74 contains a differential gear mechanism, not shown, which may incorporate, for example, a planetary gear system. The differential gear mechanism is driven in rotation by an electric motor 80, there being provided a worm and spur gear drive combination not shown, to drive the differential at reduced speed. It will be noted that the electric motor is reversible so as to provide both clockwise and counterclockwise input to the differential gear mechanism. Shaft 73 and sleeve 82 are separately driven as output members by the differential mechanism. Sleeve 82 projects rightwardly and outwardly from gear box 74 in Figure 6. Slotted cam 63 is rigidly fastened to sleeve 82 and is driven in rotation thereby between limits provided by the ends of slot 83, which is engaged by lug 84 carried by follower arm 64. The follower arm is in turn rigidly fastened to intermediate shaft 85 forming a component of shaft system 62. Intermediate shaft 85 is connected to locking arm 65 by means of a stub shaft 86 joined to arm 65, another intermediate shaft 87, and universal couplings 88 and 89.

A torsion spring 90 having one arm 91 fastened to gear box 74 and the opposite arm thereof 92 fastened to follower arm 64 is provided in order to normally urge follower arm 64 and locking arm 65 clockwise or forwardly, as viewed in Figures 7 and 8. As viewed in Figures 4 and 5, the arms 64 and 65 and shaft system 62 are normally urged counterclockwise by the spring. Referring again to Figures 7 and 8, it will be seen that arms 64 and 65 have been urged clockwise to the limit of clockwise travel, the limit being provided by over-center engagement of lug 84 on arm 64 with the end of over-center slot 93 in cam 63. In this position, the arm 64 extends rearwardly or leftwardly and slightly upwardly, with the principal slot 83 in cam 63 extending upwardly and curving slightly forwardly to intersect upwardly extending over-center slot 93 at an angle. The transverse axis of shaft 73 is disposed beneath and rearwardly of the transverse axis of shaft 85 in order that cam 63 may be rotated between the two shafts. Slot 83 is formed in such a way that starting from the bottom 94 of the slot and progressing toward over-center slot 93, successive points thereof lie at increasing distances or radii from the center of rotation of the cam 63.

It will be observed in Figures 6 and 7 that the lug 67 at the end of arm 65 is shown coming into engagement with a horizontal slot 95, which is provided in elongated retaining member 96. Member 96 is rigidly secured to a vertical extension 97 of the inside panel 98 of hard top 12, and extends rearwardly from the forward edge 99 of the roof. The slot 95 is open at one side to receive lug 67, open at the rearward end 100 thereof, and closed at the forward end 101 thereof. The slot is bounded above by an elongated horizontal flange 102 which includes a portion 103 extending rearwardly beyond the rearward end 104 of a similar flange 105 beneath the slot.

It will be observed that the lower left side edge 18a of the hard top 12 and the vertical extension 97 of inside panel 98 together form the L-shaped guide 25 or channel shown in Figure 4 for guiding the forward portion of the top on the guide strips 20a and 20b provided on the top edges of the windows 21a and 21b.

In operation, the hard top 12 is moved from elevated to lowered position in the following manner: the electric motor 80 is switched on to transmit driving torque to the differential. The differential operates as a speed reducer and to multiply the driving torque, and drives shaft system 60 clockwise as seen in Figures 4 and 5, or counterclockwise as seen in Figures 7 and 8. At the time shaft system 60 is rotated, shaft system 62 is locked against rotation by means of the locking engagement provided by cam 63 and follower arm 64, since cam 63 is prevented from rotating clockwise, in Figure 7, by the engagement of over-center slot 93 with lug 84. This cam and follower arm interlock provides the reactance against which shaft system 60 may be rotated by the differential to transmit winding torque to cable winding drums 35a and 35b. Referring back to Figure 4, the drums are rotated in a clockwise direction to wind up that portion of cable 30a extending rearwardly therefrom, and thus to pull the hard top rearwardly from its elevated position toward retracted position.

When the top 12 has been pulled rearwardly to a point where the forward portion thereof is poised only a few inches above the forward portion of the rear deck 17, as illustrated in Figure 7, the rearward extension 103 of flange 102 projecting rearwardly from retaining member 96 drops into engagement with lug 67 of upwardly projecting arm 65 in such manner as to guide lug 67 into the rearward open end 100 of slot 95. The lug 67 is thereby guided into slot 95 as the top 12 drops finally downwardly onto the rear deck 17. Now since the top moves rearwardly as well as downwardly, the lug 67 is carried rearwardly, as seen in Figure 8, until it is completely retracted, at which time the bottom edges 42a and 42b of the left and right rear side panels 37a and 37b are seated against the horizontal deck 108 in Figure 5. It will be noted that when lug 67 is carried rearwardly, the locking arms 65 and 66, the shaft system 62, and the follower arm 64 are also pivoted rearwardly against the force exerted by torsion spring 90. A few degrees of rearward pivoting of follower arm 64 effects disengagement of lug 84 thereof from over-center slot 93 in cam 63, and therefore releases the reaction theretofore provided by the interlock between cam 63 and follower arm 84. The release of the reaction against which the winding drums 35a and 35b were enabled to be driven by the differential mechanism operates to eliminate the driving torque transmitted to the drums and therefore to discontinue the winding force theretofore operative to pull the roof 12 rearwardly. However, the rearward and downward momentum of the roof 12 is more than adequate to carry the roof 12 downwardly into its full retracted position after the release of the reaction and consequent discontinuance of cable winding force.

It will be observed that the timing of the release of the interlock between cam 63 and follower arm 64 is such as to be almost coincidental with final dropping of the roof 12 into retracted position to the end that the reaction, upon which the existence of cable winding force depends, is not released until such time as roof retracting force is no longer needed. In other words, once the roof 12 has dropped into retracted position and the interlock reaction is released, the only cable winding force needed is that which is necessary to take up the slack in the cable and to tighten the rear portion of the top downward against the rear deck 13. However, once the principle reactance provided by cam and follower arm interlock is released, the differential will operate to effect rotation of either the cable winding drums 35a and 35b or the cam 63, depending upon whether or not the resistance to rotation of the cam offered by engagement of follower arm lug 64 with slot 83, torsion spring 90, and associated mechanism exceeds the resistance to rotation of the drums offered by cable slack take-up force and cable tightening force. In any event, the cables will eventually be tightened, thereby holding down the rear portion of the top 12 upon the rear deck 13, and thereby providing reactance against which the differential will transmit driving torque to the cam 63, causing clockwise rotation thereof, as seen in Figure 8. As cam 63 rotates clockwise, the edge 109 of the slot 83 will bear against the lug 84 at the end of follower arm 64, and thereby twist the arms 64 and 65 in a counterclockwise direction. The twist on arm 65 will result in a downward tightening of lug 67 thereof against flange 105 with a consequent downward loading upon the forward portion of the roof and a downward tightening thereof against the forward portion of the rear deck 13. As a result, the roof 12 will be held down upon the rear deck 13 both fore and aft. After the cables are fully tightened and the cam and follower arm have twisted so as to tighten locking arms 65 and 66 downward, the torque load on the motor 80 rapidly increases, at which time the motor is switched off automatically as by means of a overload protective switch, not shown.

When it is desired to raise the hard top 12, the motor 80 is switched on to reverse to rotate the differential mechanism oppositely. The differential will then transmit driving torque to both the drums 35a and 35b and the cam 63. The drums will attempt to wind up those portions of the cables extending forwardly from the drums, over forward pulleys 31a and 31b, and rearwardly in the channels 55 in guides 14a and 14b to the roof side panels 37a and 37b. The reaction to forward and upward movement provided by the inertia of the roof greatly exceeds the resistance to counterclockwise rotation of the cam offered by the downward loading of the forward portion of the roof upon the locking arms 65 and 66 acting on the cam through the shaft system 62 and follower arm 64. Therefore, the cam 63 will be rotated counterclockwise causing the surface 110 of slot 83 to bear against follower arm lug 84 and to push it upwardly, thereby rotating the follower arm 64 and the locking arms 65 and 66 clockwise in Figures 7 and 8. This rotation will be aided by the torsion spring 90 the arms of which had been further displaced upon retraction of the roof 12. As the locking arms are rotated clockwise, the lugs 67 and 68 thereof exert an upward force on flange 102 of retaining member 96, thereby forcing the forward portion of the roof upwardly from deck 13 to an extent governed by the length of the arms 65 and 66. When the arms 65 and 66 have rotated into almost vertical position, the lug 84 on follower arm 64 snaps into over-center slot 93 in cam 63 and interlocks therewith, as shown in Figure 7, and further clockwise rotation of the arms 65 and 66 is prevented.

The interlock of cam 63 and follower arm 64 provides the new reaction which exceeds the resistance to upward and forward movement of the hard top, and accordingly the drums 35a and 35b begin to wind up the forward portion of the cable and to pull the top upwardly and forwardly. The top is guided in its upward movement by the support wheels 41a and 41b riding in the tracks or channels 56 in guide strips 14a and 14b. As the hard top approaches its raised position, the plates 69 and 70 joined respectively to the inner walls of the side panels 37a and 37b ride up under and into contact with the lugs 67 and 68 on the locking arms 65 and 66, thereby providing a means for holding down the rear portion of the hard top 12 when the top is in raised position, as seen in Figs. 2 and 3.

Referring now to Figs. 9, 10, 11, 12 and 13, there is illustrated therein mechanism operative to lock the forward portion 115 of the hard top 12 to an anchoring means or locking head 116, which constitutes a forward extension of the hard top 12. The locking head is positioned upwardly and rearwardly from the front windshield 118 of the automobile, and extends transversely across the width of the passenger compartment. The locking head is anchored to the frame structure 119 over the front windshield and also to the top of the slanted frame structure or corner posts 120 at each side of the windshield.

Referring to Fig. 12, the locking head includes a convexly curved upper panel 121, a lower panel 122, and a vertical member 123 integrally joined to upper panel 121 and separately joined to lower panel 122. Attached to vertical member 123 are two similar tubular locking devices 124 spaced transversely and symmetrically with respect to a vertical plane passing longitudinally through the mid-portion of the automobile. Each of members 124 extends rearwardly from member 123. Each of the locking devices, as shown in Fig. 13, includes a thick-walled tubular body 125 having a cylindrical aperture 126 formed therein. The tubular body is open at the rearward facing end 127 thereof and closed at the opposite end by a transverse plate 128. Plate 128 includes flanges 129 and 130 which contain drilled holes for receiving fastening bolts for joining the device to the vertical panel member 123. The device 124 is shown in perspective in horizontal position in Fig. 13. A slot 131 is cut inwardly into the tubular body 125 toward the flanges 129 and 130, starting from one side of body 125. A second slot 132 is cut in the form of a helical spiral from the inward terminus 133 of slot 131 upwardly and forwardly to a point approximately vertically above aperture 126. The two slots 131 and 132 together form a means for engaging a locking lug 134, both to receive the lug inwardly or forwardly and also to force the lug further inwardly or forwardly as the lug is thereafter twisted through an angle corresponding to the cam or spiral angle of the slot 132.

The tubular locking devices 124 constitute means for guiding and holding or retaining corresponding locking members carried by the forward portion 115 of hard top 12. The forward portion 115 includes an upper panel 140, a lower panel 141 and a vertical panel 142 integrally joined to lower panel 141 and separately joined to upper panel 140, thereby defining a transversely extending L-shaped fitting at the forward end of portion 115 of hard top 12. The fitting is adapted to seat snugly against a corresponding transversely extending L-shaped rubber boot or seal 147 which is bonded to vertical member 123 and to each of the locking devices 124. Boot 147 includes a vertical leg 148 bonded to rearward face 127 of locking device 124. Leg 148 has an aperture 149 formed therein rearwardly of cylindrical aperture 126 and slot 131 and of similar shape, to accommodate the passage therethrough of a locking mechanism.

The forward portion 115 of top 12 carries a pair of spaced apart tongues 150, each of which is positioned in line with one of the apertures 126. Each tongue 150 includes a rearward portion 151 positioned rearwardly of panel 142 and rotatably supported by legs 152 and 153 of bracket 154, which is attached to lower panel 141. Each tongue also includes a cylindrical forward portion 156 projecting forwardly through panel 142 and adapted to be guidedly engaged by the walls of aperture 126 in locking device 124. The forward portion 156 of each tongue carries a locking lug 134, projecting outwardly and laterally therefrom, and adapted to be guidedly engaged by the walls of slots 131 and 132.

The rearward portion 151 of each tongue 150 has formed thereon a pair of eccentrically mounted cranks 160 and 161, which are drilled to receive a pin 162 pivotally engaging a transversely extending short link 163. The opposite end of link 163 is pivotally engaged in end to end relation by the forked end 164 of a second transversely extending link 165. The opposite end of link 165 threadedly engages an elongated link 166 in end to end relation. The opposite end of link 166 is threadedly and adjustably engaged by a short link 167, the opposite end of which is pivotally retained by a longitudinally extending pin or bolt 168 projecting forwardly from a flange 169. Flange 169 is eccentrically and fixedly mounted at the forward end of longitudinally mounted shaft 170 in such a way that as shaft 170 is rotated by handle 171, pin 168 is rotated with flange 169, thereby moving pin 168 in an arc and moving the links operatively connected thereto in a transverse direction.

Figure 9:
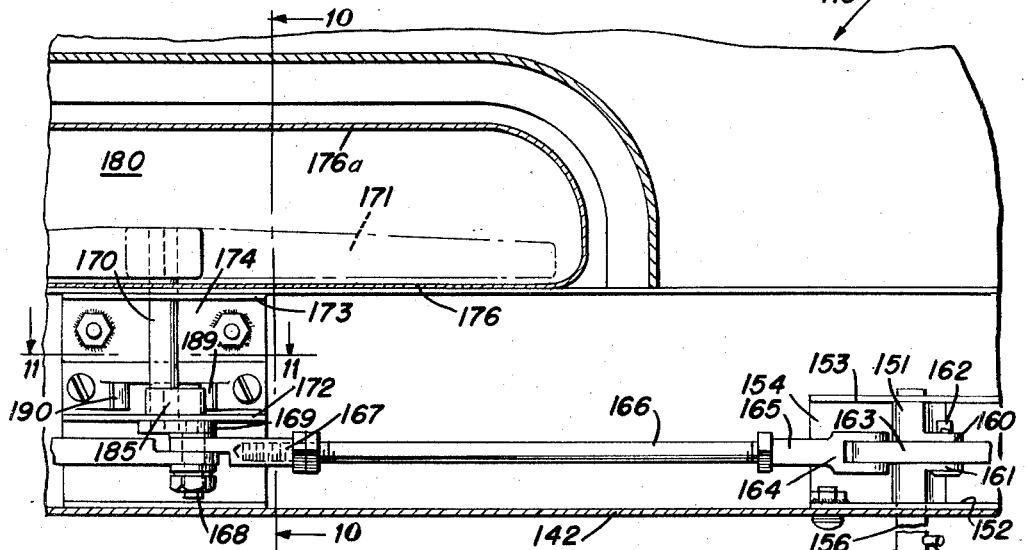
Figure 9 is a plan view of the forward locking mechanism carried by the forward portion of the hard top, and taken on line 9—9 of Figure 4.

Shaft 170 is positioned between longitudinally spaced and vertically extending arms 172 and 173 of bracket 174. Bracket 174 is rigidly joined to bottom panel 141 of forward portion 115 of the roof, with arms 172 and 173 extending upwardly into chamber 175, defined by upper and lower panels 140 and 141 and fore and aft panels 142 and 176. Panel 176 extends transversely as shown in Fig. 9, and curves rearwardly at both ends to join upwardly curved rear panel 176a to form a handle receiving recess 180 in roof 12. Recess 180 opens downwardly into the passenger compartment of the automobile at a point substantially above the position of the driver. Handle 171 may be swung through an arc of 180 degrees, and when in the zero or 180 degree position the handle fits completely within the recess 180, extending transversely therein, to the left or right.

The handle is frictionally locked in either the zero or 180 degree positions by a cam and detent mechanism. The cam 185 is rigidly joined to the shaft 170 at such an angle as to cause the groove 186 formed in the outer surface thereof to be engaged by one or the other of transversely spaced detents 187 and 188 when the handle is in either zero or 180 degree position. As seen in Fig. 11, the detents are formed in spring members having arms 189 and 190 projecting upwardly from the base of bracket 174 to which they are rigidly attached. The detents are spaced transversely or to the left and right of the cam 185 to be engaged thereby when the handle is moved into zero or 180 degree position.

When it is desired to lock the forward end 115 of the hard top 12 into locking head 116, the handle 171 is pulled downwardly into vertical or 90 degree position in order to rotate locking lugs 134 into horizontal alignment for guided engagement with the walls of horizontal straight slots 131 in locking devices 124. The top 12 is then pushed forwardly to seat lugs 134 in slots 131 either by hand or by the power driven top elevating mechanism, described supra. Thereafter, the handle 171 is rotated clockwise from the point of view of the driver, to seat the handle in roof compartment 180 and simultaneously to rotate locking lugs 134 in spiral slots 132, which action causes the lugs 134 and associated mechanism to be pulled forwardly. The result of the camming action of lugs 134 in slots 132 is that roof 12 is pulled forwardly to bring vertical panel 142 into tight, sealing engagement with rubber boot 147 and thereby to effect complete closure of the hard top 12 against locking head 116. To release the hard top, handle 171 is rotated into vertical position and pulled rearwardly, thereby moving the locking lugs 134 out of engagement with the slots 131 and 132. The handle then may be rotated either leftwardly or rightwardly into 0 or 180 degree position to lock it in compartment 180. Thereafter, the hard top 12 may be retracted as explained supra.

It will be apparent to those skilled in the art to which my invention pertains that various modifications and changes may be made therein without departing from the spirit of my invention or from the scope of the appended claims.

I claim:

1. In mechanism for moving an automobile hard top from a forward position over the passenger compartment to a rearward position over the rear deck of the automobile, and alternatively from rearward to forward position: guide means for the movement of the forward portion of the hard top between said forward and rearward positions thereof, said guide means extending from the front of said rear deck upwardly and forwardly to a position toward the front part of said passenger compartment; means carried by said rear deck for guiding forward and rearward movement of the rearward portion of said hard top; cable means attached to said hard top, said cable means including portions running forwardly and rearwardly over said rear deck and beneath said rear deck; cable winding means engaging said cable means beneath said rear deck; reversible motor means; locking means operable to hold said top in one of its positions; a differential drive mechanism drivably connected to said reversible motor means, having two power output members; means connecting one of said output members in driving relation with said cable winding means for pulling said hard top into said forward position or into said rearward position; and means connecting the other of said output members to said locking means so as to lock and unlock the same.

2. Means for retracting a movable automobile hard top onto the rear deck of an automobile, including: cable means anchored to said hard top and operative to pull said top rearwardly, said cable means including a portion extending rearwardly over said rear deck to a cable guide member, said cable portion extending beneath said rear deck from said cable guide member; cable winding means disposed beneath said rear deck and operatively engaging said cable portion; a swingable locking member projecting upwardly from the forward portion of said rear deck; complementary locking means carried by the forward portion of said hard top, said means adapted to engage said locking member upon retraction of said hard top; and powered drive mechanism differentially connected to said cable winding means and to said pivoted locking member, whereby upon retraction of said hard top the forward portion thereof may be held down upon said rear deck by said locking member and the rearward portion thereof may be held down by said cable portion engaging said cable guide member.

3. The invention as set forth in claim 2 including biasing means operatively connected to said locking member for holding said member in position for engagement with said locking means upon retraction of said top.

4. The invention as set forth in claim 2 including a coupling device operatively connected between said powered drive mechanism and said locking member, said device being operative to preclude pivoting of said locking member prior to engagement of said member with said complementary locking means and to allow pivoting of said member upon said engagement.

5. In mechanism for moving an automobile hard top from rearward position over the rear deck of the automobile into forward position over the passenger compartment and for holding the top in forward position: cable means attached to said hard top, said cable means including a first portion extending rearwardly from said hard top over the rear deck of said automobile and a second portion extending beneath said deck; cable winding means positioned beneath said deck and engaging said second cable portion; a locking arm extending upwardly from the forward portion of said rear deck; rearward locking means carried by the rear portion of said hard top for hold-down engagement with said locking arm; forward locking means carried by the forward portion of said hard top for guided engagement with complementary locking means disposed above the forward windshield of said automobile; and powered drive mechanism operatively connected to said cable winding means for moving said hard top forwardly into position over the passenger compartment, whereby said forward and rearward locking means may be brought into hold-down engagement with said complementary locking means and said locking arm.

6. Means for retracting an automobile hard top onto the rear deck of an automobile including: means for guiding rearward movement of said hard top; a cable having opposite ends thereof operatively connected to a rearward portion of said movable hard top, said cable including an extended intermediate portion; guide means for said extended cable portion positioned longitudinally and beneath the rear deck of said automobile; drum means engaging said cable for winding said cable forwardly or rearwardly; a pivotally mounted locking arm projecting upwardly from said rear deck and operative to engage and to hold down said hard top on retraction thereof; differential drive mechanism having a first output member drivingly connected to said drum and a second output member operatively connected to said arm; and motor means drivingly connected to the input of said differential drive mechanism.

7. Means for retracting an automobile hard top onto the rear deck of an automobile including: means for guiding rearward movement of said hard top; a cable having opposite ends thereof operatively connected to a rearward portion of said movable hard top, said cable having an extended intermediate length; means for guiding longitudinal movement of said cable spaced longitudinally and beneath the rear deck of said automobile; drum means engaging said cable for winding said cable forwardly or rearwardly; a pivotally mounted locking arm projecting upwardly from said rear deck and including means for engaging latching mechanism carried by said hard top on retraction thereof; means for releasably locking said arm in upward position; differential drive mechanism including an input member, a first output member operatively connected to said arm to rotate said arm rearwardly, and a second output member operatively connected to said drum; and motor means drivingly connected to the input member of said differential mechanism, whereby said hard top may be retracted rearwardly by said drum against the reaction of said arm locking means, and said movable top may be locked in retracted position by rearward rotation of said locking arm against reaction of said drum upon release of said locking arm.

8. In an automobile having side doors, a mechanism for moving an automobile hard top from a forward position over the passenger compartment to a rearward position over the rear deck of the automobile, and alternatively from rearward to forward position: forward and rearward guide means for the forward and rearward portions of the hard top, said forward guide means extending from the front of said rear deck upwardly and forwardly in elevated relation to the forward portion of the passenger compartment and including parts supported on the upper edges of said doors, and said rearward guide means extending from the rearward portion of said rear deck upwardly and forwardly to the front portion of said rear deck; means respectively on the forward and rearward portions of said hard top engaging said forward and rearward guide means so as to move therealong during the movement of said hard top between said forward and rearward positions thereof; transmission means for moving said top between forward and rearward positions thereof; a locking means for securing said top in one of its positions; and differential drive means having two power output members connected respectively to said transmission means and said locking means for sequential operation thereof.

9. In mechanism for moving an automobile hard top from a forward position over the passenger compartment to a rearward position over the rear deck of the automobile, and alternately from rearward to forward position: forward and rearward guide means for the forward and rearward portions of the hard top, said forward guide means extending from the front of said rear deck upwardly and forwardly in elevated relation to the forward portion of the passenger compartment, and said rearward guide means extending from the rearward portion of said rear deck upwardly and forwardly to the front portion of said rear deck; means respectively on the forward and rearward portions of said hard top engaging said forward and rearward guide means so as to move therealong during the movement of said hard top between said forward and rearward positions thereof; transmission means for moving said top between forward and rearward positions thereof; a locking means for securing said top in one of its positions; and differential drive means having two power output members connected respectively to said transmission means and said locking means for sequential operation thereof.

References Cited in the file of this patent
UNITED STATES PATENTS

| | | |
|---|---|---|
| 2,051,140 | Grimston | Aug. 18, 1936 |
| 2,105,293 | Paulin | Jan. 11, 1938 |
| 2,215,363 | Rupple | Sept. 17, 1940 |
| 2,575,864 | Croucher | Nov. 20, 1951 |

FOREIGN PATENTS

| | | |
|---|---|---|
| 415,376 | Great Britain | Aug. 21, 1934 |